United States Patent
Van Buskirk et al.

(10) Patent No.: US 8,430,179 B2
(45) Date of Patent: Apr. 30, 2013

(54) SOIL TILLING AND PLANTING IMPLEMENT

(75) Inventors: Loyd C. Van Buskirk, Brownsdale, MN (US); Brian R. Meldahl, Brownsdale, MN (US)

(73) Assignee: L & B Manufacturing, Inc., Brownsdale, MN (US)

( * ) Notice: Subject to any disclaimer, the term of this patent is extended or adjusted under 35 U.S.C. 154(b) by 234 days.

(21) Appl. No.: 12/771,219

(22) Filed: Apr. 30, 2010

(65) Prior Publication Data
US 2010/0275827 A1 Nov. 4, 2010

Related U.S. Application Data

(60) Provisional application No. 61/214,955, filed on Apr. 30, 2009.

(51) Int. Cl.
| | | |
|---|---|---|
| *A01B 29/048* | (2006.01) | |
| *A01B 63/32* | (2006.01) | |
| *A01B 33/12* | (2006.01) | |
| *A01B 35/28* | (2006.01) | |
| *A01B 39/08* | (2006.01) | |
| *A01B 39/19* | (2006.01) | |
| *A01C 7/208* | (2006.01) | |
| *E02F 9/006* | (2006.01) | |
| *E02F 9/205* | (2006.01) | |
| *E02F 3/188* | (2006.01) | |
| *E02F 3/20* | (2006.01) | |
| *E02F 9/2037* | (2006.01) | |
| *A01C 5/064* | (2006.01) | |
| *A01C 5/068* | (2006.01) | |
| *A01C 7/201* | (2006.01) | |
| *A01B 33/103* | (2006.01) | |
| *A01B 35/16* | (2006.01) | |
| *A01B 49/027* | (2006.01) | |
| *A01B 49/06* | (2006.01) | |

(52) U.S. Cl.
USPC ........... 172/166; 172/554; 172/552; 172/548; 172/151; 172/173; 172/187; 172/198; 172/810; 172/315; 172/321; 172/325; 172/326; 172/453; 172/484; 172/657; 172/661; 172/662; 172/663; 172/684.5; 172/685; 172/748; 172/752; 172/762; 172/763; 172/766; 172/771; 111/139; 111/167; 111/927; 701/50

(58) Field of Classification Search .................. 111/118, 111/140, 170, 139, 149, 157, 163, 167, 927; 172/540, 542, 551, 554–556, 1, 189, 518, 172/604, 599, 601, 165, 166, 701, 552, 548, 172/140, 145, 149–151, 170, 172, 173, 184, 172/187, 195, 198, 260.5, 239, 261, 263–268, 172/272–275, 810, 310, 315–318, 321, 324–326, 172/387, 388, 391, 394, 395, 407, 413, 423, 172/424, 452, 468, 453, 483–485, 613, 619, 172/624, 624.5, 634–637, 657, 661–663, 172/668, 675, 677–681, 684.5, 685, 705, 172/711, 714, 734, 736, 739, 740, 748, 752, 172/762, 763, 765, 766, 771; 701/50
See application file for complete search history.

(56) References Cited

U.S. PATENT DOCUMENTS

| | | |
|---|---|---|
| 3,177,828 A | 4/1965 | Cramer |
| 3,314,386 A | 4/1967 | Kopaska |

(Continued)

OTHER PUBLICATIONS

Korean Intellectual Property Office, International Searching Authority, International Search Report, Written Opinion of the International Searching Authority with Notice mailed May 16, 2012 in International Application No. PCT/US2011/057076, 9 pages.

*Primary Examiner* — Christopher J Novosad

(74) *Attorney, Agent, or Firm* — Nikolai & Mersereau, P.A.; C. G. Mersereau (57) ABSTRACT

The combination of a rolling basket tillage implement and a seed distribution implement is disclosed. A height-adjustable mounting system for a rolling basket soil tillage implement is also disclosed for use with a planter that enables such an implement to be raised above the soil as needed to avoid wet conditions.

6 Claims, 5 Drawing Sheets

U.S. PATENT DOCUMENTS

| | | |
|---|---|---|
| 3,523,585 A | 8/1970 | Godbersen |
| 3,528,507 A | 9/1970 | Morkoski |
| 3,554,145 A | 1/1971 | Hornung et al. |
| 4,227,581 A | 10/1980 | Klotzbach |
| 4,422,511 A | 12/1983 | Poggemiller et al. |
| 4,444,130 A | 4/1984 | Ray |
| 4,489,789 A | 12/1984 | Pearce |
| 4,615,396 A | 10/1986 | Arnold |
| 4,624,471 A | 11/1986 | Haines et al. |
| 4,625,809 A | 12/1986 | Moynihan |
| 4,865,132 A | 9/1989 | Moore Jr. |
| 5,052,495 A | 10/1991 | McFarlane et al. |
| 5,479,992 A | 1/1996 | Bassett |
| 5,562,054 A | 10/1996 | Ryan |
| 5,797,460 A | 8/1998 | Parker et al. |
| 6,068,061 A | 5/2000 | Smith et al. |
| 6,135,567 A | 10/2000 | Cochran |
| 6,142,085 A | 11/2000 | Drever et al. |
| 6,581,530 B1 | 6/2003 | Hall et al. |
| 6,688,245 B2 | 2/2004 | Juptner |
| 6,701,857 B1 | 3/2004 | Jensen et al. |
| 6,926,093 B1 | 8/2005 | Fink et al. |
| 7,308,859 B2 | 12/2007 | Wendte et al. |
| 7,360,494 B2 | 4/2008 | Martin |
| 7,360,495 B1 | 4/2008 | Martin |
| 7,395,767 B2 | 7/2008 | Sulman |
| 7,426,893 B2 | 9/2008 | Wendte et al. |
| 7,451,712 B2 | 11/2008 | Bassett et al. |
| 7,472,658 B2 | 1/2009 | Ostlie |
| 7,574,969 B1 | 8/2009 | Henry et al. |
| 7,575,066 B2 | 8/2009 | Bauer |
| 7,578,246 B2 | 8/2009 | Ryder et al. |
| 7,594,546 B2 | 9/2009 | Ankenman |
| 7,640,875 B2 | 1/2010 | Forchino |
| 7,673,570 B1 | 3/2010 | Bassett |
| 7,861,660 B2 | 1/2011 | Martin |
| 7,866,410 B2 | 1/2011 | Ryder et al. |
| 7,921,931 B2 | 4/2011 | Henry et al. |
| 7,938,074 B2 | 5/2011 | Liu |
| 7,946,231 B2 | 5/2011 | Martin et al. |
| 7,975,630 B2 | 7/2011 | Bourgault et al. |
| 7,980,186 B2 | 7/2011 | Henry |
| 7,992,650 B2 | 8/2011 | Landoll et al. |
| 7,997,217 B2 | 8/2011 | Stark et al. |
| 8,028,632 B2 | 10/2011 | Ryder et al. |
| 8,028,759 B2 | 10/2011 | Ryder et al. |
| 8,042,620 B2 | 10/2011 | Henry |
| 8,047,147 B2 | 11/2011 | Harnetiaux |
| 8,069,798 B2 | 12/2011 | Martin |
| 8,100,192 B2 | 1/2012 | Henry et al. |
| 8,100,193 B2 | 1/2012 | Henry et al. |
| 2003/0226670 A1 | 12/2003 | Knobloch et al. |
| 2005/0263050 A1 | 12/2005 | Bassett et al. |
| 2008/0302283 A1 | 12/2008 | Martin |
| 2008/0314301 A1 | 12/2008 | Whalen et al. |
| 2009/0107370 A1 | 4/2009 | Ostlie |
| 2010/0006309 A1 | 1/2010 | Ankenman |
| 2010/0006310 A1 | 1/2010 | Bauer |
| 2010/0275827 A1 | 11/2010 | Van Buskirk et al. |
| 2010/0300710 A1 | 12/2010 | Bassett |
| 2011/0000410 A1 | 1/2011 | Manasseri et al. |
| 2011/0067613 A1 | 3/2011 | Martin |
| 2011/0179983 A1 | 7/2011 | Ryder et al. |
| 2011/0231069 A1 | 9/2011 | Ryder et al. |
| 2011/0232550 A1 | 9/2011 | Van Buskirk et al. |
| 2011/0239920 A1 | 10/2011 | Henry |
| 2011/0247537 A1 | 10/2011 | Freed |
| 2011/0247843 A1 | 10/2011 | Whalen et al. |
| 2011/0284252 A1 | 11/2011 | Friggstad et al. |
| 2011/0303137 A1 | 12/2011 | Tevs et al. |
| 2011/0308826 A1 | 12/2011 | Ryder et al. |
| 2012/0006240 A1 | 1/2012 | Henry |
| 2012/0012042 A1 | 1/2012 | Castagno Manasseri et al. |
| 2012/0012349 A1 | 1/2012 | Van Buskirk et al. |
| 2012/0017813 A1 | 1/2012 | Van Buskirk et al. |
| 2012/0042811 A1 | 2/2012 | Harnetiaux |
| 2012/0042814 A1 | 2/2012 | Harnetiaux |
| 2012/0048159 A1 | 3/2012 | Adams et al. |
| 2012/0048160 A1 | 3/2012 | Adams et al. |
| 2012/0060730 A1 | 3/2012 | Bassett |
| 2012/0060731 A1 | 3/2012 | Bassett |
| 2012/0151910 A1 | 6/2012 | Sauder et al. |

SOIL TILLING AND PLANTING IMPLEMENT

CROSS-REFERENCED TO RELATED APPLICATIONS

This application is a non-provisional application of Application No. 61/214,955, filed Apr. 30, 2009, and claims priority from that application which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

This invention is generally directed to the field of agriculture machinery, and more particularly, it relates to a preplanting tillage implement used in combination with a seed planting device. Specifically, the invention relates to a rolling basket tillage implement used in tandem with a seed planting implement in which the rolling basket may have an independent height adjustment aspect.

II. Related Art

In the spring, prior to planting, farmers must prepare their fields for accepting seed. Many tillage implements have been designed and are used to condition the soil in preparation for planting. Traditional farming includes both primary and secondary tillage tasks to prepare the soil such as plowing, disking, field cultivating and harrowing. Disking is an example of a method of primary tillage and harrowing is an example of a method of secondary tillage.

Primary tillage is a first pass over the soil using a soil conditioning implement attached to the rear of a tractor which works deep into the soil. The soil is usually worked about four inches deep to break up clods of soil, remove air pockets, and destroy weeds deep in the earth. Secondary tillage involves another pass over the same soil, at a more shallow depth, using implements which are generally attached to the rear of the primary tillage unit such that the secondary tillage unit follows the primary tillage unit. The secondary tillage unit generally works the soil to a depth of about two inches.

The secondary tillage unit is usually a final conditioning tool to prepare the soil for planting. Such units may chop up crop residues, break up soil clods and break up any crust on the top of the soil, provide weed control, incorporate chemicals into the soil, and stir and firm the soil closer to the surface.

Rolling basket seedbed finishers represent an important type of secondary soil conditioning implement.

Rolling baskets are primarily used as soil leveling devices to break up and minimize clods of soil and to remove air pockets from the soil. Farmers obtain great benefit from using rolling baskets as a means of secondary tillage to provide a level soil for planting. The ability to break up clods of soil, remove air pockets and further incorporate chemicals generally leads to better crop yields at harvest.

Accordingly, it would be beneficial if a secondary tillage operation using a rolling basket could advantageously be combined with a planting operation such that one could take immediate advantage of soil in condition for planting by accomplishing the planting project during the same pass over a field. Thus, the attachment of rolling basket tillage for use in conjunction with a seed planting implement would be desirable.

However, the use and effectiveness of rolling baskets or other soil conditioning implements is greatly limited by the condition of the soil. If the soil is too wet, rolling basket soil conditioning implements may become filled and clogged with soil which make them useless for further soil conditioning until they are again emptied of soil. When a farmer realizes that areas of soil in a field are too wet to use such implements, he will generally forego the use of such soil conditioning implements entirely for the season. This means that much of the soil may not be properly treated and an expensive farming implement will lay idle. This is not a desirable or economically efficient situation for farmers.

It would, therefore, also be beneficial to provide an arrangement or mechanism that enables intermittent use of a soil conditioning implement, particularly a rolling basket seedbed finisher, and/or a planter in a field where areas of soil are dry enough for use, but where there are also areas which are too wet for use. Such a device would allow a farmer to raise rolling basket seedbed finishers above the soil and out of use whenever they reach a section of a field where the soil is too wet and thereafter enable the rolling basket finisher to be lowered and reconnect with the soil in areas where the soil is suitable for use.

SUMMARY OF THE INVENTION

The present concept is related to combining said conditioning implement in the form of rolling basket seedbed finishers with planters to accomplish multiple tasks in a single pass. An aspect of the present concept relates to mounting rolling basket seed finishers on planting equipment. A further aspect of the present concept is related to a mounting assembly for a soil conditioning implement in the form of a rolling basket seedbed finisher. The mounting assembly is for individual rolling baskets which are a part of a plurality of such soil conditioning implements generally arranged in a spaced aligned manner on a multi-row planter, seed drill or other implement, which is used to distribute seeds into the soil, hitched to and pulled by a tractor or other prime mover.

Certain embodiments of the mounting assembly include a height adjustable mounting arrangement for each of the rolling basket soil conditioning implements. Each height adjusting mechanism includes an actuator for adjusting the relative height of a corresponding rolling basket individually, and an associated control system for operating the height adjusting mechanism. The actuator preferably includes a hydraulic or pneumatic cylinder, which may be single or double acting. It is also an aspect of the present invention for the mounting assemblies and associated implements to be combined with a planter and arranged such that rolling basket soil conditioning takes place in front of each individual seed planting unit on a planter.

In a preferred embodiment, each mounting assembly for each rolling basket soil conditioning implement may be controlled from a central control system that includes control switches or a control pad, or the like, having a control device associated with each rolling basket located in the cab of an associated tractor. In this manner, a user is able to adjust the height of each mounting assembly individually and therefore the height of each associated soil conditioning rolling basket implement may be adjusted individually as needed.

It will be appreciated by those skilled in the art that a plurality of actuator devices such as pneumatic or hydraulic cylinders, or the like, together with the necessary controls can be connected to be operated from the cab of a tractor or other farm implement device prime mover by conventional means in a well known manner.

In other embodiments, the rolling basket devices may be fixed to the planter and other mechanical devices may be used to apply varying degrees of force to the soil being processed. These include compression or torsion springs, inflatable air bags, shock absorber devices which may be spring loaded, or the like. Air bag systems may be single or double acting.

BRIEF DESCRIPTION OF THE DRAWINGS

The foregoing features and advantages of the invention will become apparent to those skilled in the art from the following detailed description of one or more preferred embodiments, especially when considered in conjunction with the accompanying drawings in which.

DETAILED DESCRIPTION

This description of the preferred embodiments is intended to illustrate representative examples of inventive concepts and is not intended to be limiting as to the scope of the concepts. The examples are to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

An aspect of the invention is directed to an adjustable mounting bracket assembly for attaching a soil conditioning implement in the form of a rolling basket device, particularly to the frame of a planter. As shown in the embodiment of FIGS. 3-8, the mounting assembly 2, for a rolling basket soil conditioner 10 comprises at least three parts, a height adjustable mounting 4, a height adjusting mechanism or actuator, which may be in the form of a hydraulic (6A in FIG. 9E) or pneumatic cylinder 6, and an associated control system (FIG. 10) for operating a plurality of such height adjusting mechanisms to adjust the height of a plurality of spaced associated connected rolling baskets as normally used in tandem with a planter as towed by a tractor.

Figure 3:
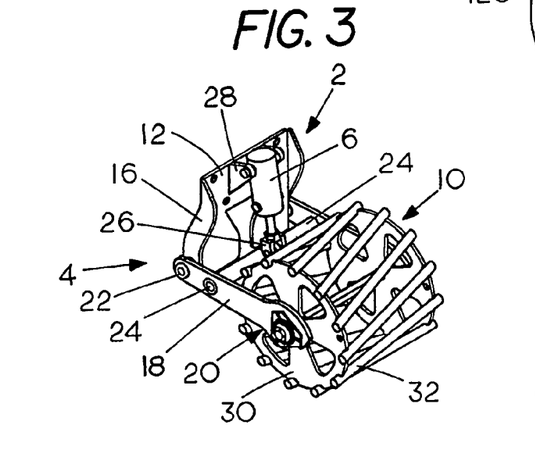
FIG. 3 shows a perspective view of an alternative mounting assembly attaching a rolling basket.

As illustrated in FIG. 3, the height adjustable mounting 4 is composed of several parts including an attachment plate 12 and a pair of spaced parallel side plate members 16 and attachment arms 18 for coupling the rolling basket soil conditioning implement to the attachment plate 12. The attachment plate 12 is adapted to be fixed to the frame of a farming implement in the form of a conventional planter along with the attachment plates of other units such that the soil ahead of each planting unit is conditioned.

Each mounting assembly includes spaced arms 18 which extend away from an associated rolling basket soil conditioning and leveling implement 10 which is journaled for rotation between the arms 18 as at 20. The arms 18 connect to the members 16 fixed to the attachment plate 12. The arms 18 are connected to each other by a common crossbar 24 which also supports one end of a cylinder or actuator 6.

Figure 4:
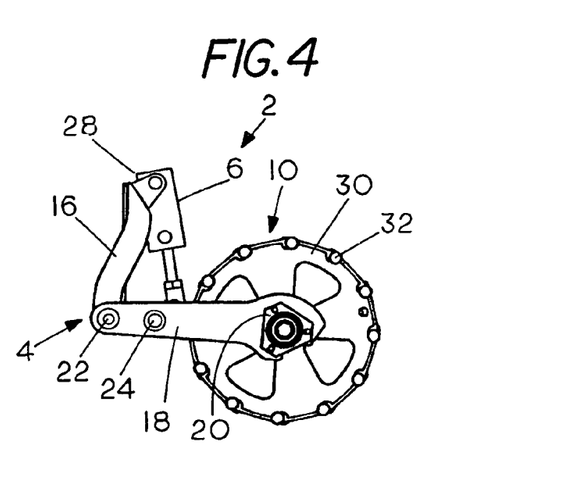
FIG. 4 shows a side view of the mounting assembly of FIG. 3.

As illustrated in FIGS. 3 and 4, the arms 18 and the members 16 of the attachment plate 12 are designed such that they pivotally connect to each other. Any manner known in the art which connects and enables the arms 18 to pivot at 22 relative to the members 16, such as bearings, bushings, etc., can be employed so that the adjustable mounting 4 is able to move towards and away from the surface of the ground with the operation of cylinder 6 which may be attached using a clevis arrangement as at 26 to attach the rod end and a bracket arrangement as at 28 to attach the blind end of the cylinder 6 to the attachment plate 12.

Figure 5:
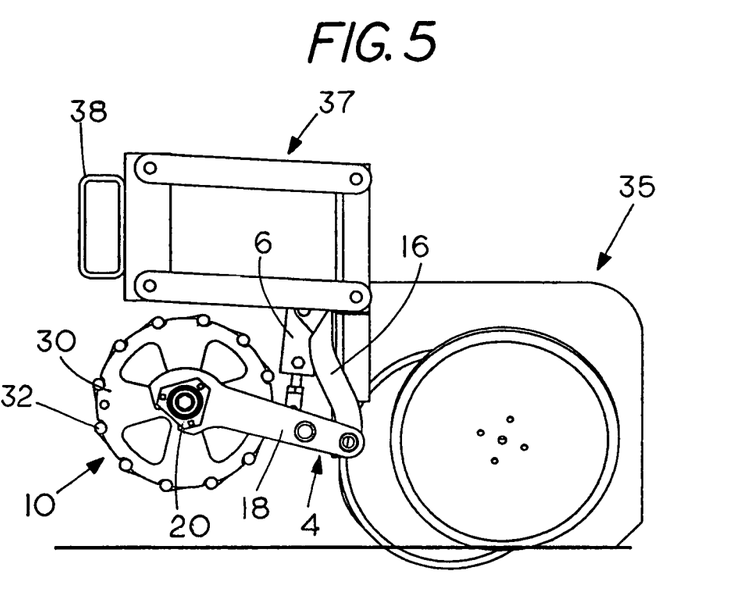
FIG. 5 illustrates the mounting assembly of FIGS. 3 and 4 attached to the front of a planting implement with the soil conditioning rolling basket shown in a raised position.

The height adjusting actuator 6 may be a hydraulic or pneumatic cylinder, or other devices, as illustrated, those skilled in the art will recognize that any mechanical mechanism able to raise and lower the soil conditioning implement 10, as shown in FIGS. 5 and 6, may be used. Thus, in some embodiments, height adjusting depends on raising the planter with the rolling baskets attached. In those embodiments, downward force may be provided by a spring-operated mechanism, an inflatable air spring, or any similar system known in the art, such as are shown in FIGS. 9A-9D. As indicated, several preferred embodiments utilize pneumatic cylinders as compressed air is generally available on tractors to connect to and operate farm implements. It will be recognized, however, that hydraulic systems are also commonly used in these types of applications.

The rolling basket units 10 further include a pair of side plates 30 connected by a plurality of spaced steel bars 32 which may be internally or externally attached to the plates 30. A central spindle or axle 34 is also provided.

FIGS. 5, 6A, 6B, 7A and 7B also depict a planting implement 35 having a seed distributing arrangement 36 (FIG. 6B) and a connecting frame 37 including a main structural member 38 that connects together a plurality of similar units 35.

Figure 6A:
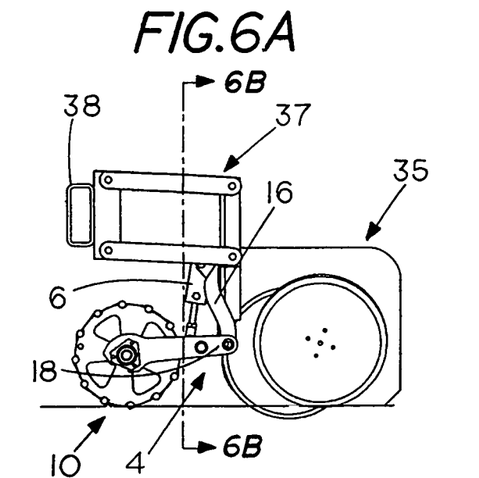
FIG. 6A is a view similar to FIG. 5 showing the soil conditioning rolling basket implement in a lowered ground engaging position.
Figure 6B:
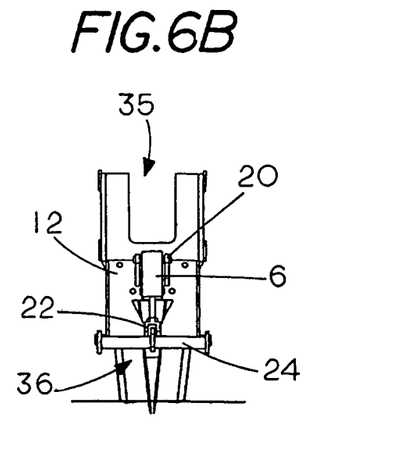
FIG. 6B is a cross-sectional view taken along line B-B of FIG. 6A.

As shown in FIGS. 5 and 6A, the operation of the actuator 6 serves to raise and lower the soil conditioning rolling basket implement 10 in accordance with the operation of a control system. It should be noted that in an implement carrying a plurality of soil conditioning rolling baskets 10, as shown in FIG. 10, an associated control system enables the raising and lowering of the soil conditioning implements individually as desired by the operator in the tractor or other towing vehicle. It may also enable the soil conditioning implement 10 to be positioned in a floating mode riding the soil surface or lowered with applied force as needed.

Figure 1:
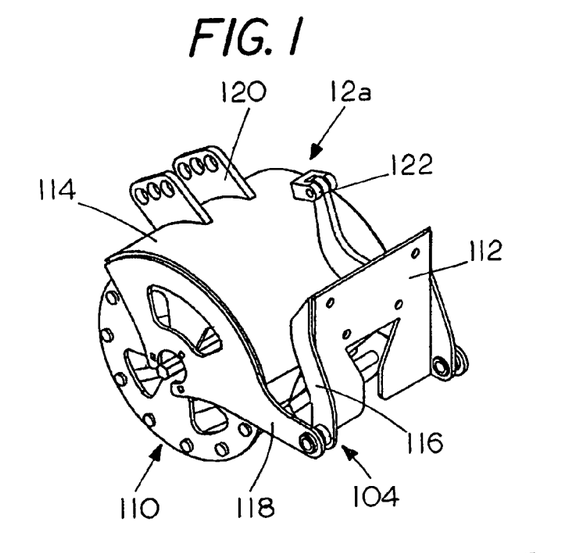
FIG. 1 shows a perspective view of a mounting assembly using a shell-type assembly to attach to a rolling basket.
Figure 2:
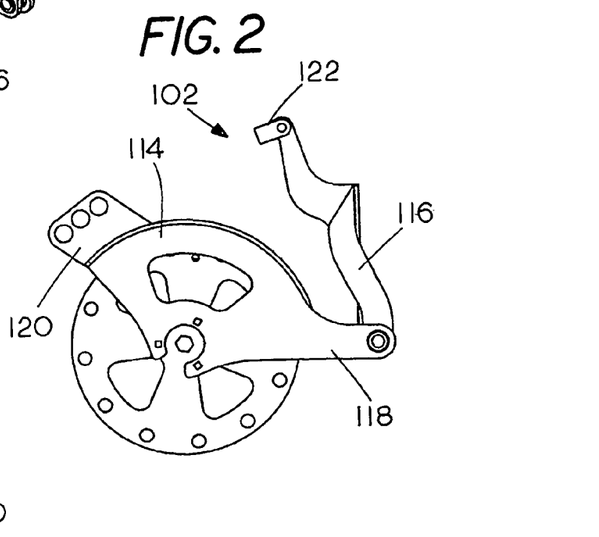
FIG. 2 shows a side view of the mounting assembly of FIG. 1.

An alternate embodiment of the mounting bracket assembly is shown generally at 102 in FIGS. 1 and 2 and also includes a height adjustable mounting 104. That system utilizes a shell or shroud 114 covering the upper portion of the rolling basket 110. Pivotally connected members 116 and arms 118 are shown together with mounting bracket 120 and clevis attachment 122. The actuating cylinder or other such device is not shown.

FIG. 10 is a schematic drawing of a soil conditioning system used with a multi-row seed planter so that a field may be properly leveled and thereafter receive seeds from the planter modules. In this schematic drawing, a tow bar 40 is connected to a trailer tongue 42 that is adapted to be connected by a clevis (not shown) to a towing work vehicle, such as a farm tractor. Secured to the tow bar are a plurality of rolling basket tillage devices 44.

Primary tillage devices (not shown) may, for example, comprise disk harrows or rake harrows of conventional design known in the art may be used prior to employing the rolling baskets. As previously explained, the primary harrows are arranged to dig deeper into the soil and typically produce clumps depending on soil type and moisture content. It is preferable that the clumps become crushed and broken up and the soil leveled by the action of the secondary rolling basket devices 44 leaving the field prepared to receive seed at the time of seeding and the seed distributed by planter modules 46.

The user or driver of the tractor or other prime mover determines whether the soil is too wet for the soil conditioning implements 2 to effectively work or not. If the soil is too wet, the user sends a signal via the control system, to activate the height adjusting mechanism 4. In a preferred embodiment, the height adjusting mechanism is connected to a pneumatic system which has an air compressor 50 for maintaining a predetermined pressure in an accumulator 52. At least one pneumatic solenoid valve 58 is connected between the accumulator and each actuator 6 to control the application of the pressure supplied to the actuator 6. A manifold 56 in FIG. 10 is shown as supplying pressurized air, via solenoid valves 58, to one or more actuators 6 under control of electrical signals from an operator's controller module which includes a key pad control (which may be remote) at 60. A combined electrical and pneumatic connection is shown at 62 and a manifold controller is shown at 64. The system may incorporate a pressure regulator (not shown) to adjust the amount of force (from the pressurized air) applied to raise the soil conditioning implement.

Pressurized air is then supplied to the pneumatic cylinders 6 in a well known manner to the mounting assembly, which, in turn, will raise the soil conditioning implement if the user has determined the soil in that location is too wet for use, or lower the soil conditioning implement if the soil is suitable to use the soil conditioning implement. It will be appreciated that the cylinders 6 may be single or double acting with single acting cylinders used to raise the soil conditioning implements on the power stroke and allow the basket to float under its own weight when the pressure is released. Double acting cylinders can be used to fix the implement in a lowered position.

As also shown in FIG. 10, each of the plurality of rolling basket soil conditioning assemblies may be placed in front of each of a plurality of seed distribution units of a planter as at 46 to ready the soil to receive the seeds. Each of the mounting assemblies for the soil conditioners may be controlled individually or simultaneously with others. Also, groups of mounting assemblies may be controlled. If the mounting assemblies are controlled individually, the manifold 56 (either pneumatic or hydraulic), may supply pressurized air through the use of solenoid valves 58. The operator is able to control the height adjustment and so the application of one soil conditioning implement, a specific group of soil conditioning implements, or all of the soil conditioning implements using the control pad 60 in the cab of the tractor. As indicated, the control pad 60 may be any kind known in the art for sending control signals to solenoid or other pneumatic or hydraulic valves.

The system allows for maximum efficiency of the soil conditioning implements, for if one row or a few of the rows in a field are too wet, but the remaining rows are dry, the user may selectively apply the soil conditioning rolling basket implements to suitable rows. The user, therefore, is able to maximize the effect of using rolling basket soil conditioning devices in a field.

Figure 7A:
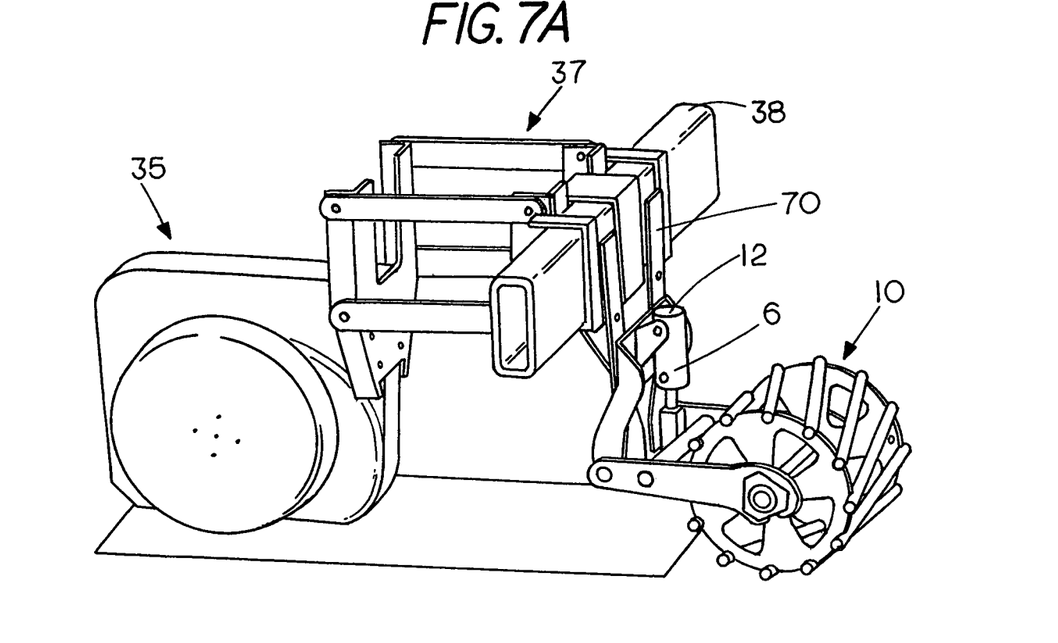
FIG. 7A is a schematic perspective view showing a rolling basket attached to a main frame member of a planter implement.
Figure 7B:
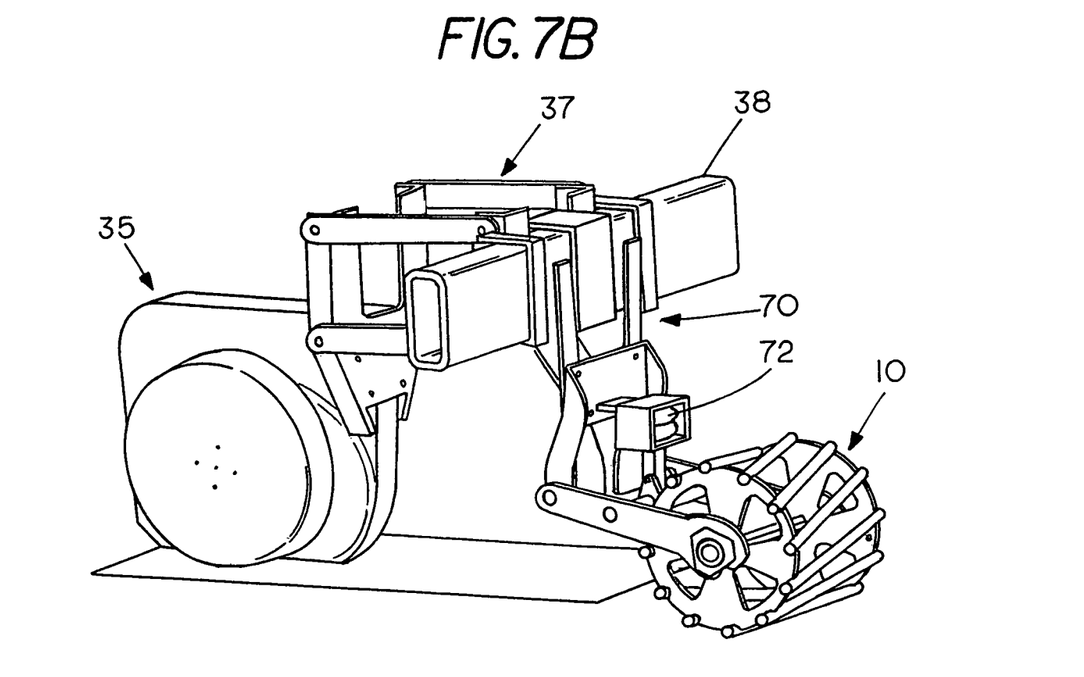
FIG. 7B is a view similar to FIG. 7A with a double acting air bag as the actuator.
Figure 8:
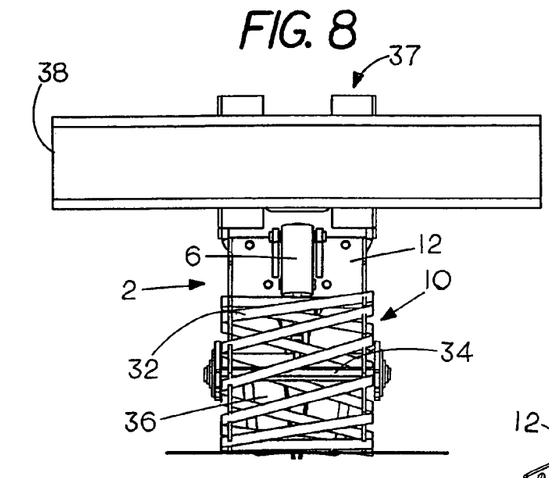
FIG. 8 is a front view of the mounting assembly of FIGS. 3-7 attached to a farming implement.

FIG. 7A depicts a rolling basket device 10 in accordance with the invention fixed to the main structural member 38 of a planting implement, a unit of which is shown at 35 in which the attachment plate 12 is attached to the member 38 by an additional framework 70. A similar arrangement is shown in FIG. 7B in which the actuator is a double acting air bag system as at 72.

Figure 9A:
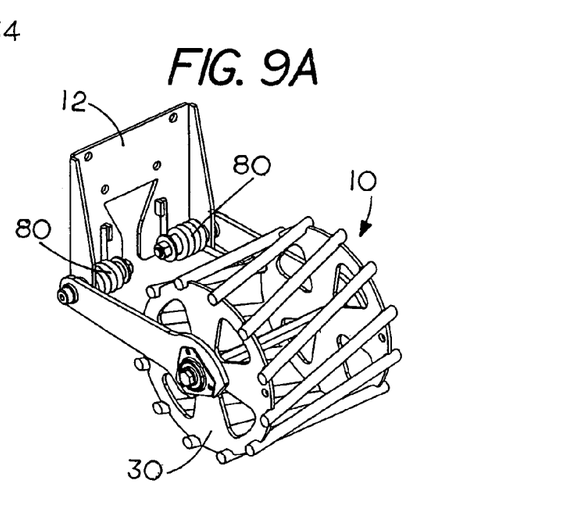
FIGS. 9A-9F depict other embodiment of rolling baskets similar to those of FIGS. 1 and 3 using other types of actuating or force-applying devices.
Figure 9B:
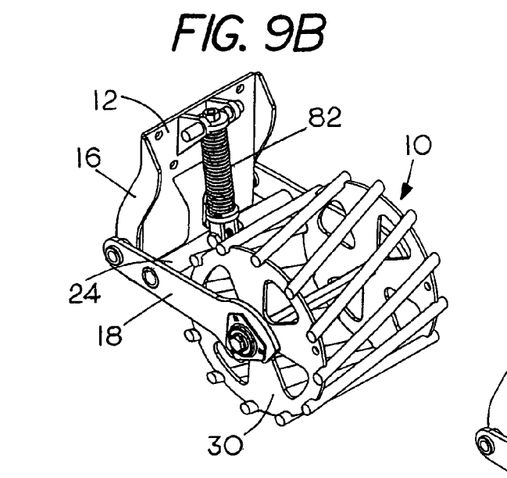
Figure 9C:
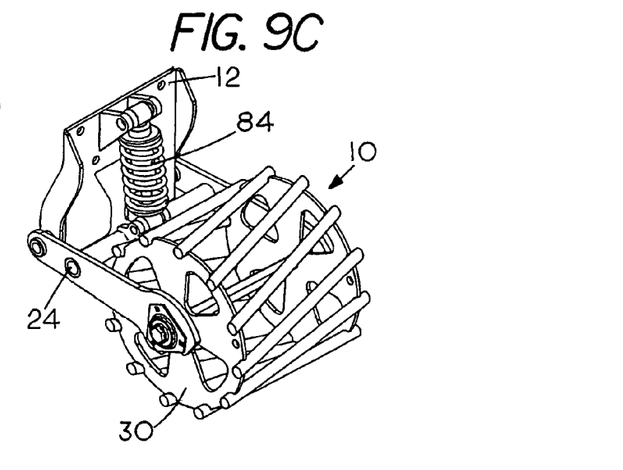
Figures 9D, 9E, 9F, 10:
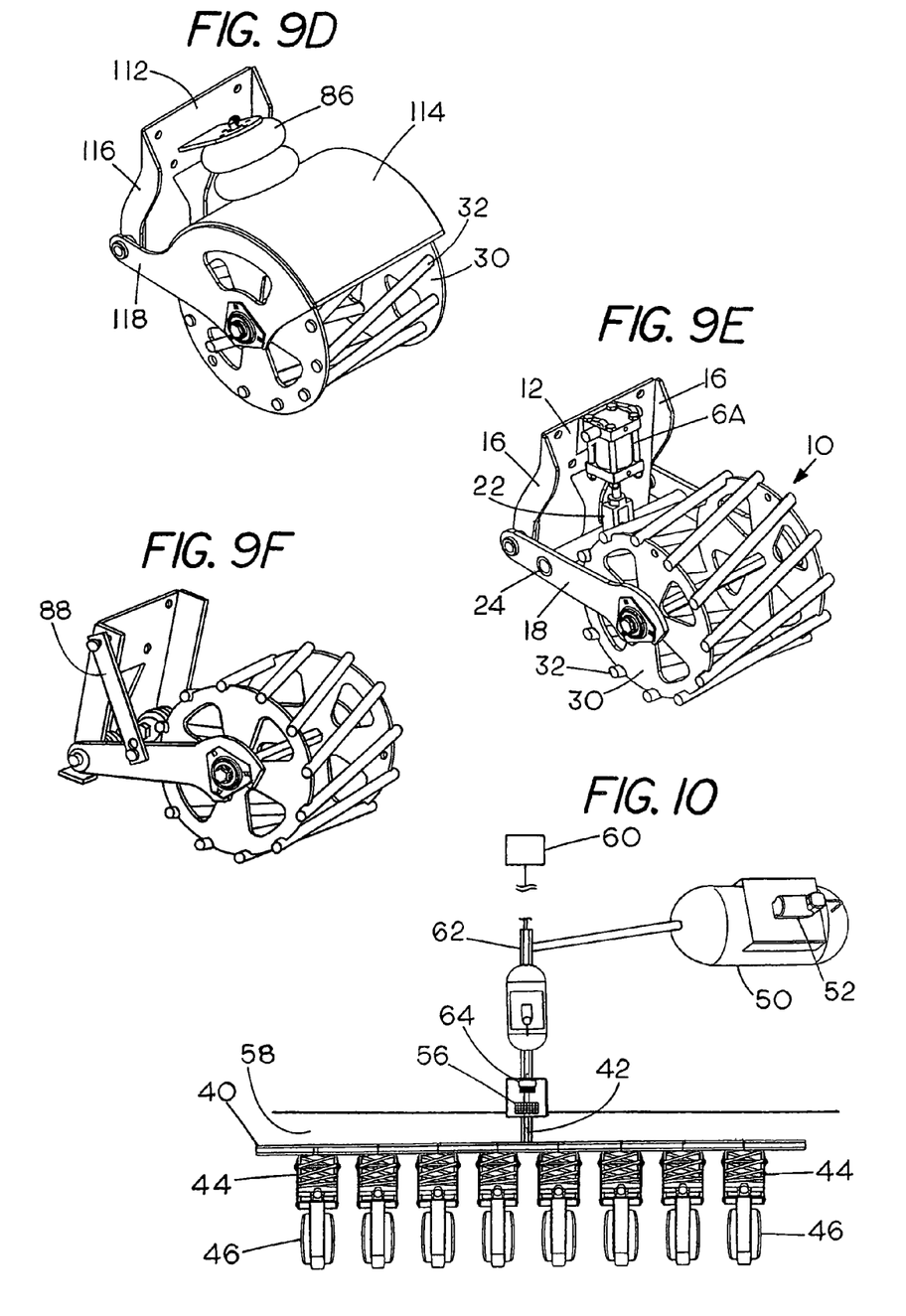
FIG. 10 is a block diagram of a pneumatic control system for controlling mounting assemblies and a schematic drawing of a rolling basket soil conditioning system combined with a multi-row planter.

FIGS. 9A-9E depict alternative actuator devices used in combination with the rolling baskets. They include a pair of torsion springs as at 80 in FIG. 9A which are used to provide an amount of downward force on the rolling basket 10. Similarly, FIG. 9B utilizes a compression spring 82 connected between mounting plate 12 and cross member 24. A spring and shock absorber arrangement 84 is shown in FIG. 9C and a single acting air bag or air shock absorber is shown in FIG. 9D.

It should be noted that rolling baskets having mounting arrangements with devices providing downward force only are normally raised manually when they need to be out of contact with the soil. They are held in a raised position using a manually-operated latch system such as is at 88 shown in FIG. 9F.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A soil conditioning implement comprising a remotely controllable height-adjustable attachment mechanism for a mounting arrangement for a soil conditioning implement further comprising:
   (a) a mounting plate adapted to be fixed to a device that is adapted to be drawn by a prime mover;
   (b) a pair of arms pivotally attached to the mounting plate in parallel, spaced relation flanking said soil conditioning implement, said arms extending away from the mounting plate;
   (c) a rolling basket tillage implement journaled for rotation between the pair of arms; and (d) a remotely controllable mechanical device operatively coupled between the mounting plate and the pair of arms for selectively raising and lowering the rolling basket tillage implement relative to the ground or providing a directional force on said tillage implement.

2. A soil conditioning implement as in claim 1 wherein said mechanical device is selected from single and dual acting air bag systems.

3. A soil conditioning implement as in claim 1 further comprising a control system for said mechanical device that is operable from said prime mover.

4. A soil conditioning implement as in claim 1 wherein the prime mover is a tractor.

5. A soil conditioning implement as in claim 1 wherein said mechanical device comprises a dual acting air bag.

6. A soil conditioning implement as in claim 1 wherein said mechanical device comprises a single acting air bag.

* * * * *